# 2,703,243

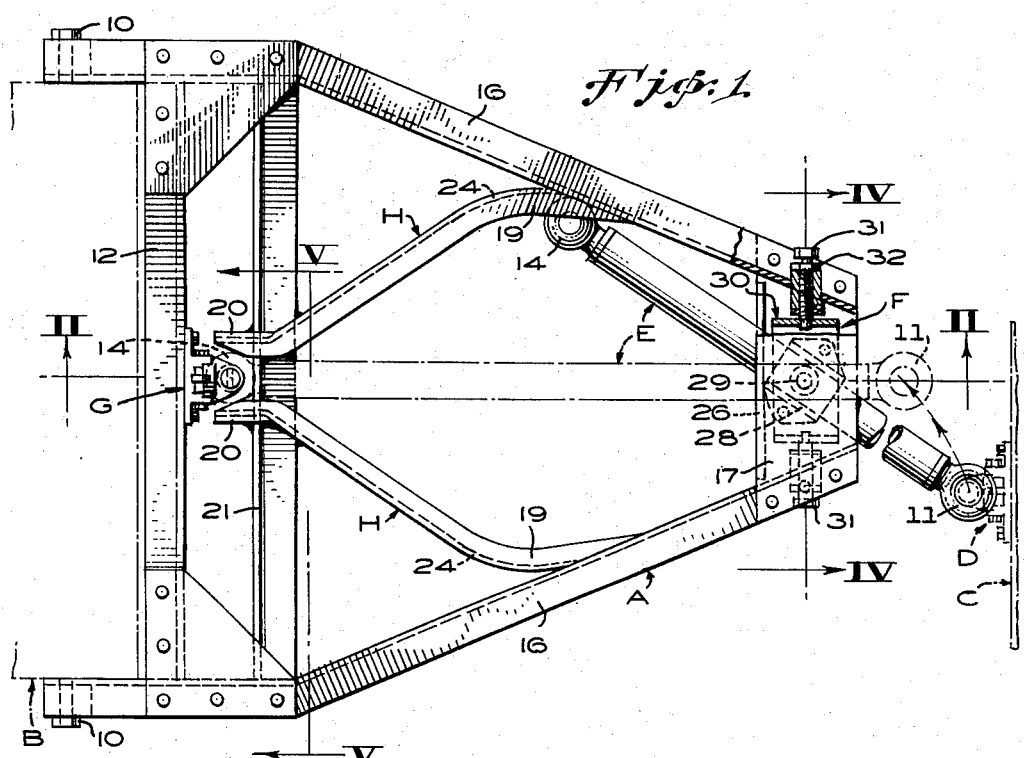

AUTOMATIC DRAFT-TONGUE ALIGNER AND COUPLER

Kenneth C. Clark, Watsonville, Calif.

Application November 10, 1952, Serial No. 319,626

5 Claims. (Cl. 280—477)

The present invention relates to improvements in an automatic draft-tongue aligner and coupler. It consists of the combinations, constructions, and arrangement of parts, as hereinafter described and claimed.

For many years, the trucking industry has been confronted with the problem of moving a towing vehicle into a position of substantial alignment with its trailer, or the like, in order to permit attachment of the draft-tongue of the trailer to the towing vehicle. This problem has been aggravated by facts that the towing vehicle normally must be backed toward its trailer; the draft-tongue of the trailer is heavy and cumbersome to handle; and it is difficult to shift the draft-tongue laterally.

In United States Letters Patent Nos. 2,451,660 and 2,488,805, in which I am co-patentee, extensible draw-bars are provided on the draft-tongue of trailers so as to be movable into engagement with a pintle coupler of the towing vehicle, and arranged to align the draft-tongue with the towing vehicle upon backing the vehicle toward the trailer.

An object of this invention, however, is to provide an automatic draft-tongue aligner and coupler, which embodies improvements and refinements over the foregoing patented devices; producing a simplified construction; and resulting in a positive and unfailing coupling of the trailer to the towing vehicle.

Other objects and advantages will appear as the specification proceeds. The novel features will be set forth in the claims hereunto appended.

Drawings

For a better understanding of my invention, reference should be had to the accompanying drawings, forming part of the application, in which:

Figure 1 is a top plan view of a draft-tongue of a trailer having my aligner and coupler incorporated thereinto, the full line position of the extensible draw-bar illustrating the latter being connected to the pintle coupler of a towing vehicle offset relative to the trailer;

Figure 2 is a longitudinal sectional view taken along the plane II—II of Figure 1;

Figure 3 is a view similar to the Figure 2, but disclosing the draw-bar anchored to a pintle coupler on the draft-tongue; and Figures 4 and 5 are transverse sectional views taken along the planes IV—IV and V—V, respectively, of Figure 1.

While I have shown only the preferred form of my invention, it shoulde be understood that various changes, or modifications, may be made within the scope of the annexed claims without departing from the spirit thereof.

Detailed description

Referring to the drawings, I have illustrated a draft-tongue indicated generally at A, which is hinged by pins 10—10 to the sides of a trailer B, or the like. Also, a towing vehicle C is provided with a conventional pintle coupler D adapted to have the front eye 11 of a draw-bar E fastened thereto.

As clearly shown in Figures 1 and 2, the intermediate portion of this draw-bar is slidably disposed in a universal guide F for extension, retraction and swinging of the draw-bar into various angular positions, all relative to the draft-tongue.

Moreover, another pintle coupler G is secured to a transverse member 12 of the draft-tongue rearwardly of the drawbar. The latter is fashioned with an eye 14 at the rear end thereof, which is adapted for engagement over an upstanding hook 15 of the draft-tongue pintle coupler G when the draw-bar is fully retracted, as shown in Figure 3.

It will be noted that the tongue A includes side members 16—16, which diverge rearwardly relative to one another, the forward ends of these members being fastened together by top and bottom gusset plates 17 and 18, respectively. The universal guide F is mounted between these plates in the manner hereinafter described.

Now it will be observed from Figure 1 that a pair of guide tracks H—H are arranged on opposite lateral sides of the braw-bar E, and converge rearwardly with respect to each other so as to terminate on opposing sides of the upstanding hook 15 of the draft-tongue coupler G. The forward sections 19—19 of these tracks are curved so as to merge into the side members 16—16 without interruption, while their rear sections 20—20 parallel one another and are fixed to a transverse member 21 extending across the draft-tongue. The curved sections of the tracks will facilitate entry of the rear eye 14 onto these tracks as the draw-bar is pushed rearwardly.

In their structural features, the tracks H—H are channel-shaped in transverse section, defining top and bottom flanges 22 and 23, respectively. These flanges straddle the rear portion of the draw-bar E to limit up and down movement thereof as the draw-bar is moved rearwardly relative to the draft-tongue. As the draw-bar is thus moved, the rear eye 14 thereof will abut the web 24 of one guide track, or the other, depending upon the angular relation on the draw-bar relative to the tongue, and will be brought into a restricted throat defined between the rear parallel sections 20—20 of the guide tracks.

With special reference to Figure 2, it will be seen that the bottom flanges 23 are inclined upwardly and rearwardly so as to lift the rear eye 14 into a position to drop over the hook 15 as this eye enters the throat provided between the track sections 20—20. After this has occurred, a swingable latch 25 may be lowered and secured to the hook so as to retain the draw-bar eye 14 on the latter.

In order to assure entry of the eye 14 of the draw-bar between the flanges 22—23 of one guide track H, or the other, as the towing vehicle C is backed toward the trailer B, stops 26 and 27 are provided on the gusset plates 17 and 18, respectively. These stops limit up and down movement of the draw-bar E to the extent that the latter must engage with the guide tracks H—H as the draw-bar E is pushed rearwardly.

For the details of the universal guide F, particular reference should be had to Figures 1 and 4, wherein it will be clear that an inner split sleeve 28 slidably receives the draw-bar E. This sleeve has trunnions 29—29 projecting therefrom, which are journalled in a rectangular-shaped gimbal frame 30 for rotation about a vertical axis. In turn, this frame is mounted for rotation on inner cylindrical ends of horizontally-aligned studs 31—31. The latter are carried by the side members 16—16 of the draft-tongue, and are secured in adjusted position by locking nuts 32—32.

As shown in Figure 4, the gimbal frame 30 has been provided with a removable bar 33a, which is fastened to the upright sides of this frame by cap screws 33. This construction will facilitate assembling of the gimbal frame around the split sleeve 28 through which the draw-bar extends.

Summary

The operation of my automatic draft-tongue aligner and coupler is summarized briefly as follows:

Assuming that the trailer B is offset laterally relative to the towing vehicle C, in the manner disclosed in Figure 1, the operator grasps the draw-bar E and extends it from the draft-tongue A. Thereupon, the front eye 11 is secured to the conventional pintle coupler D on the vehicle. This connection is facilitated by the fact that the universal guide F permits the draw-bar to be extended, retracted, or swung into various angular positions.

Next, the vehicle C is backed toward its trailer. During this movement, the draw-bar will be pushed rearwardly, with its rear eye 14 being guided along one of the tracks H, when the draw-bar E has sufficient angular relationship with respect to the longitudinal centerline of the draft-tongue A to cause the eye 14 to take a position abutting the vertical web 24 of the track H being engaged. The stops 26—27 assure entry of this eye between the flanges 22—23 of the track against which the draw-bar abuts. At no time will the eye 14 ride over the top flange 22 of a guide H, or under the transverse member 21, as long as it is contact with the vertical web of one of the guide members or between the top and bottom flanges of a guide member.

As the draw-bar approaches a central axial relation with the draft-tongue, as suggested by the dot-dash lines in Figure 1, the rear eye 14 enters the restricted throat between the parallel sections 20—20 of the guide rails H—H, and the tongue is caused to swing laterally. Moreover, the inclined flange 23 has lifted the eye 14 until it overlies and registers with the upstanding hook 15 of the draft-tongue coupler G. Now this eye drops downwardly over the hook. Lowering of the latch 25 will complete attachment of the trailer to the towing vehicle.

I claim:

1. In an automatic draft-tongue aligner and coupler: a draw-bar having an eye at a forward end thereof, which is attachable to a pintle coupler of a towing vehicle; means supporting the draw-bar on a draft-tongue of a trailer, or the like, for extension, retraction and swinging of the draw-bar into various angular positions, all relative to the draft-tongue; a pintle coupler secured to the draft-tongue rearwardly of the draw-bar; the latter having an eye at the rear end thereof engageable with the pintle coupler on the draft-tongue; and means for guiding the draw-bar, when the latter is disposed in horizontal angular relationship of sufficient magnitude to cause the draw-bar to engage with the guide means to bring its rear eye into coupling relation with the draft-tongue coupler when the draw-bar is moved rearwardly relative to the draft-tongue.

2. In an automatic draft-tongue aligner and coupler: a draw-bar having an eye at a forward end thereof, which is attachable to a pintle coupler of a towing vehicle; means supporting the draw-bar on a draft-tongue of a trailer, or the like, for limited universal movement therebetween, and for extension and retraction of the draw-bar relative to the draft-tongue; a pintle coupler secured to the draft-tongue rearwardly of the draw-bar; the latter having an eye at the rear end thereof engageable with a pintle coupler on the draft-tongue; and a pair of guide tracks arranged on opposite lateral sides of the draw-bar, and converging rearwardly relative to one another to terminate on opposing sides of the draft-tongue coupler; each track having a vertical web; these tracks being positioned to have the rear eye of the draw-bar abut thereagainst, and arranged to guide the rear eye into coupling relation with the draft-tongue coupler, when the draw-bar has sufficient angular relationship with respect to the longitudinal centerline of the draft-tongue to cause the rear eye of the draw-bar to take a position abutting the vertical web of the track being engaged, and the draw-bar is moved rearwardly relative to the draft-tongue.

3. The combination as set forth in claim 2, in which the draft-tongue includes rearwardly-diverging side members; and the forward portions of the guide tracks are curved to merge into these side members without interruption, to thereby facilitate entry of the rear eye of the draw-bar onto the tracks as the draw-bar is moved rearwardly.

4. In an automatic draft-tongue aligner and coupler; a draw-bar having an eye at the forward end thereof, which is attachable to a pintle coupler of a towing vehicle; means supporting the draw-bar on a draft-tongue of a trailer, or the like, for limited universal movement therebetween, and for extension and retraction of the draw-bar elative to the draft-tongue; a pintle coupler secured to the draft-tongue rearwardly of the draw-bar, and including an upwardly-extending hook; the draw-bar having a hook-engaging eye at the rear end thereof; and a pair of guide tracks arranged on opposite lateral sides of the draw-bar, and converging rearwardly relative to one another to terminate on opposing sides of the hook of the draft-tongue coupler; each track having a vertical web; the tracks being positioned to have the rear eye of the draw-bar abut thereagainst, and arranged to guide the rear eye towards a position of registration with said hook, when the draw-bar has sufficient angular relationship with respect to the longitudinal centerline of the draft-tongue to cause the rear eye to take a position abutting the vertical web of the track being engaged, and the draw-bar is moved rearwardly relative to the draft-tongue; these tracks including lower inclined flanges arranged to lift the rear eye into a position to drop over said hook during final rearward movement of the draw-bar.

5. The combination as set forth in claim 4, in which stops are provided to limit up and down movement of the draw-bar to the extent that the rear eye of the latter must engage with the vertical web of one of the guide tracks as the draw-bar is moved rearwardly, when the draw-bar occupies said angular relationship.

References Cited in the file of this patent

UNITED STATES PATENTS

| | | |
|---|---|---|
| 2,451,660 | Clark et al. | Oct. 19, 1948 |
| 2,488,805 | Clark et al. | Nov. 22, 1949 |